US008943782B2

(12) United States Patent
Dax et al.

(10) Patent No.: US 8,943,782 B2
(45) Date of Patent: Feb. 3, 2015

(54) DEVICE AND METHOD FOR PACKAGING OBJECTS (75) Inventors: Roman Dax, Baretswill (CH); Thomas Luginbuehl, Ibach (CH)

(73) Assignee: Ferag AG, Hinwil (CH)

( * ) Notice: Subject to any disclaimer, the term of this patent is extended or adjusted under 35 U.S.C. 154(b) by 1105 days.

(21) Appl. No.: 12/768,204

(22) Filed: Apr. 27, 2010

(65) Prior Publication Data

US 2010/0269457 A1 Oct. 28, 2010

(30) Foreign Application Priority Data

Apr. 28, 2009 (CH) .......................................... 666/09
Jul. 6, 2009 (CH) ....................................... 1045/09

(51) Int. Cl.
| | |
|---|---|
| B65B 9/06 | (2012.01) |
| B65B 51/30 | (2006.01) |
| B29C 65/02 | (2006.01) |
| B29C 65/00 | (2006.01) |
| B65B 25/14 | (2006.01) |
| B29C 65/08 | (2006.01) |

(52) U.S. Cl.
CPC . *B65B 9/06* (2013.01); *B29C 65/02* (2013.01); *B29C 66/1122* (2013.01); *B29C 66/4312* (2013.01); *B29C 66/81815* (2013.01); *B29C 66/8226* (2013.01); *B29C 66/83421* (2013.01); *B29C 66/8351* (2013.01); *B29C 66/83511* (2013.01); *B29C 66/83513* (2013.01); *B29C 66/8491* (2013.01); *B65B 25/14* (2013.01); *B65B 51/30* (2013.01); *B29C 66/0042* (2013.01); *B29C 66/81463* (2013.01); *B29C 65/087* (2013.01)

USPC .............................. 53/450; 53/374.4; 53/550

(58) Field of Classification Search
USPC ........... 53/450, 550, 400, 441, 455, 471, 477, 53/370.7, 374.4, 374.5, 374.6, 389.5, 551, 53/556; 156/73.1, 308.2, 580.1; 198/575
See application file for complete search history.

(56) References Cited

U.S. PATENT DOCUMENTS

| | | | | |
|---|---|---|---|---|
| 4,709,537 A | * | 12/1987 | Ballestrazzi et al. ........... | 53/550 |
| 5,031,386 A | * | 7/1991 | Schneider ....................... | 53/551 |
| 5,197,262 A | * | 3/1993 | Katz et al. ....................... | 53/550 |
| 5,285,621 A | * | 2/1994 | Ballestrazzi et al. ........... | 53/556 |
| 5,377,478 A | * | 1/1995 | Kovacs et al. ................... | 53/550 |
| 5,653,085 A | * | 8/1997 | Suga ................................ | 53/75 |

(Continued)

FOREIGN PATENT DOCUMENTS

| | | |
|---|---|---|
| DE | 1 915 044 | 4/1965 |
| EP | 0 368 095 | 5/1990 |

(Continued)

*Primary Examiner* — Scott A. Smith
(74) *Attorney, Agent, or Firm* — Rankin, Hill & Clark LLP (57) ABSTRACT

A device and a method are provided for packaging flat objects into a packaging material web (110). The device includes a conveyor device (30) with an essentially plane conveyor surface (34) which is capable of conveying the flat objects (100) one after the other and distanced to one another in a conveyor direction (F). Moreover, at least one processing tool (10) with a processing-active zone (12) is present. The processing tool (10) is capable of processing the packaging material web (110) in the region between two objects (100) in a processing region (B) of the device (1). Thereby, the packaging material web (110) covers the objects (100) on both sides. The processing tool (10) is movable for processing at least perpendicularly to the conveyor surface (34).

19 Claims, 4 Drawing Sheets

(56) References Cited

U.S. PATENT DOCUMENTS

| | | | |
|---|---|---|---|
| 6,085,487 A * | 7/2000 | De Vlaam | 53/176 |
| 6,178,719 B1 * | 1/2001 | Hansen | 53/374.4 |
| 6,860,086 B2 * | 3/2005 | Rosloot et al. | 53/441 |
| 6,938,398 B2 * | 9/2005 | Borchard | 53/512 |
| 7,059,103 B2 * | 6/2006 | Ninomiya et al. | 53/450 |
| 7,325,373 B2 * | 2/2008 | Boldrini et al. | 53/374.4 |
| 7,328,544 B2 * | 2/2008 | Yokota et al. | 53/167 |
| 7,610,737 B2 * | 11/2009 | Kovacs | 53/450 |
| 7,658,053 B2 * | 2/2010 | Honegger | 53/450 |

FOREIGN PATENT DOCUMENTS

| | | |
|---|---|---|
| EP | 0 537 844 | 4/1993 |
| EP | 0 894 721 | 2/1999 |
| GB | 1 274 832 | 5/1972 |
| WO | 2005/118402 | 12/2005 |

\* cited by examiner

Schnitt A-A

DEVICE AND METHOD FOR PACKAGING OBJECTS

BACKGROUND OF THE INVENTION

1. Field of the Invention

The invention lies in the field of packaging technology and relates to a method and to a device for packaging flat objects, according to the preamble of the respective independent patent claims. The device according to the invention serves for packaging flat objects, for example printed products or of stack-like groups of printed products. Individual printed products or stacks of printed products and other flat objects, such as CDs, sample objects or sample sachets, may be packaged.

2. Description of Related Art

It is known to package flat objects of the type mentioned above with the help of a quasi-endless packaging material web, e.g. plastic film fed from a roll, film from natural materials (eco-film) or paper. Thereby, such a packaging material web is applied around the objects which are conveyed one after the other in a row and distanced from one another, or a packaging material web is fed to such a row on both sides. Then, the packaging material web is closed in the longitudinal direction on the upper side of the row or laterally thereof, in longitudinal seams, and between in each case two consecutive objects transversely to the longitudinal direction, in transverse seams. As the case may be, the objects which are enclosed by the packaging material on all sides in this manner are also separated from one another directly after creating the transverse seams or simultaneously with this.

With the use of plastic film as a packaging material, the longitudinal seams and transverse seams are usually created by way of welding, wherein the separation of the packaged objects may be carried out simultaneously with the creation of the transverse seams.

For processing operations such as welding, gluing etc., the objects are conveyed into a processing device and conveyed out of this again. The processing device is advantageously designed in a manner such that the conveying of the objects to be packaged does not need to be interrupted for the processing, but may be operated in a continuous manner. The objects therefore normally lie on a conveyor rest of a conveyor unit and on this, are moved into or through the processing region of the processing device.

Corresponding processing devices are known from WO 2005/118402, WO 2007/147269 or WO 2009/039673. With the welding devices described there, the welding tools have downholders which are arranged laterally of the processing-active zone (of the hot welding bar). These serve for pressing the packaging material web against the conveyor surface, in the region between two adjacent objects which are, however, distanced from one another, and in the direct vicinity of the welding seam to be created. The downholders are set up such that the two regions of the material web to be connected are firstly pressed against one another on both sides of the envisaged welding seam, and against the conveyor surface. Only then is the hot processing-active zone lowered onto the material. The packaging material is held in a smooth manner directly before this welding process and the quality of the connection is improved by way of these packaging material web downholders.

However, the following problem occurs with the known packaging material web downholders: The processing tool, for processing, exerts a certain force onto the packaging material web and thus indirectly onto the conveyor rest. The conveyor rest as a rule is yielding. For example, it is the case of a conveyor belt of a belt conveyor, which may yield under loading. The conveyor belt may also comprise a compressible layer. The compliance of the conveyor rest, above all with heavier objects, e.g. stacks of different printed products, leads to the objects being able to be displaced in the packaging material web, when the pressure due to the processing tool is relieved and the conveyor rest springs back. The fresh, still soft welding seam is loaded and possibly compromised by way of this. Thereby, it may come to pass that individual packaging units, thus individual objects packaged into bags of packaging material, are dislocated on the conveyor surface. This is disadvantageous, above all for the further processing steps, such as e.g. the gripping of the individual packaging units.

It is therefore the object of the invention to specify a device and a method, with which the mentioned problems are avoided. In particular, a good control of the position of the objects is to be ensured at all times before, during and after the processing.

BRIEF SUMMARY OF THE INVENTION

The device according to the invention, for packaging objects, in particular flat and/or flexible products, such as printed products, into a packaging material, comprises a conveyor unit with a conveyor rest which has an essentially flat conveyor surface. The conveyor unit is capable of conveying the flat objects, one after the other, and distanced from one another, in a conveyor direction. Moreover, at least one processing tool with a processing-active zone is present. The processing tool is capable of processing the packaging material web in a processing region of the device, in the region between two objects, in particular of creating connections between the lower and the upper region of the packaging material web, when the packaging material web covers the objects on both sides. Here, the region distant to the conveyor surface is indicated as the upper region, and the lower region lies on the conveyor surface. For processing, the processing tool is movable at least perpendicularly to the conveyor surface, preferably also with a movement component in the conveyor direction. According to the invention, at least one object downholder is provided. The object downholder is designed in a manner such that in the processing region, it may calm at least one of the objects which is adjacent the processing location, by way of holding down. It may press the object against the conveyor surface, at least if the distance of the object upper side which is distant to the conveyor surface, to the conveyor surface, or to the processing-active zone, exceeds a defined value, e.g. on exceeding a critical object thickness. The objet downholder may, thus, exert a counter-force onto at least one object as the case may be. This counter-force counteracts the springing-away of the objects from the conveyor surface, when the conveyor surface returns to its initial position or springs upwards beyond this. The force which is exerted by the deflected conveyor surface onto the objects may thus be compensated by the downholder. The objects are, thus, guided in a controlled manner or held on the conveyor rest by way of the object downholder. With thin objects, it may occur that the object downholder only acts on the object when the distance or the height difference between the object upper side distant to the conveyor surface and the conveyor surface or the processing-active zone exceeds a certain value. This predefined value for example corresponds to a critical object thickness, but may also be smaller or zero.

The method according to the invention has the following steps:

conveying the objects one after the other and distanced from one another, in a conveyor direction through a processing region, wherein the packaging material web covers the objects on both sides;

moving the processing tool at least at a point of the processing region, perpendicularly to the conveyor surface;

processing the packaging material web in the region between two objects, in particular manufacturing connections between an upper region distant to the conveyor surface and a lower region of the packaging material web, which faces the conveyor surface;

calming at least one of the objects by way of holding-down with an object downholder, wherein the object is pressed against the conveyor surface on exceeding a critical object thickness or deflection.

The objects or the finished packaging units are secured against being dislocated, in a simple manner and at every point in time of the processing, by way of the invention and in particular by way of the object downholders. Such dislocations may be caused due to a springing back of the conveyor surface which as a rule is yielding and is deflected and/or deformed by the tool when the processing pressure is relieved. The position of the objects may, thus, be easily controlled at every point in time of the processing. For example, in the case of welding, one also prevents the still soft welding seam from being loaded and being able to open again by way of this.

The object downholder acts in the region of the objects and not in the packaging material web region between two objects, which is in contrast to the packaging material web downholders which are already known. The object downholder is, therefore, designed and arranged such that, seen in the conveyor direction, it is capable of cooperating with the object at a distance from the processing-active zone, which is greater than half the distance between two objects (measured between the trailing edge of an object and the leading edge of a subsequent object).

It is not absolutely necessary for the object downholder to exert a force onto the objects on processing. It is sufficient if it prevents a springing-away of the object from the conveyor surface. Its active surface, e.g. its lower side facing the conveyor surface, in the loaded condition may, thus, have a pre-defined distance to the conveyor surface and oppose the further increase of this distance by way of a springing-back object with a certain resistance. This distance is preferably selected such that objects with a certain (standard) thickness are only just touched by the object downholder, but no mutual forces are exerted.

The object downholder is preferably resilient. It is, for example, resilient per se (e.g. shape elasticity, compressible material) and/or is attached on a holding element, e.g. the tool carrier in a resilient manner. Its spring constant is preferably smaller than that of the conveyor surface: The object downholder yields when an object is enclosed between the object downholder and the conveyor surface. On the other hand, the spring constant is preferably large enough to be able to reliably guide and position the object.

The object downholder is preferably movable, and is introduced into the processing region during the processing of the packaging material web. The object downholder is moved for example synchronously with the processing tool, but otherwise independently of this. Its movement does not need to be in the conveyor direction; an introduction into the processing region from the side is also possible.

Particularly preferably, the object downholder is fastened on the tool carrier and in this manner is moved synchronously with this. An individual drive for the object downholder is done away with by way of this. In the case that an additional packaging material web downholder is present (see below), then the object downholder may also be fastened on this.

The processing tool is moved with at least one speed component perpendicularly to the conveyor direction (lowering onto the conveyor surface and lifting up again). Preferably additionally, yet a movement in the conveyor direction is present. For this, the processing tool or its processing-active zone is preferably moved along a closed revolving path, which runs in the processing region in the direct vicinity of the conveyor surface, preferably essentially parallel to this. The speed component in the conveyor direction is thereby preferably essentially as large as the conveyor speed of the objects.

Particularly preferably, the orientation of the processing tool is controllable. Examples as to how this may be realised are described in the applications WO 2007/147269 and WO 2009/039673 which are mentioned above. Controllable processing tools have the advantage that they may be placed onto the material web in a targeted manner, also between thicker objects. For this reason, the object distance may be reduced, which permits a material saving, higher conveyor rates and/or reduced conveyor speeds.

By way of a bent shape of the active surface of the downholder, it is possible for the downholder to roll on the object upper side or on a fictive surface which runs at a predefined distance to the conveyor surface, when the downholder makes a circular moment or a movement along a curved movement path.

Preferably, also at least one packaging material web downholder is present in addition to the object downholder. This, in the region between two objects, acts on the packaging material web and presses its upper and lower regions against the conveyor surface, before the processing active zone of the processing tool presses onto the packaging surface. The packaging material web downholder is preferably designed such as described in WO 2005/118402.

In a preferred variant of the invention, one prevents the packaging material web from remaining stuck on the processing tool after the processing. This may occur particularly on welding a packaging material web, if the web, due to an error in the object feed, does not enclose an object, thus empty pouches are formed. These are very light and may thus be taken along with the processing tool, even if they only slightly stick to this. The same may likewise happen to very light objects under certain circumstances. Errors are caused by way of this, for example if the empty pouches or light objects detach from the processing tool in an uncontrolled manner at a later stage. Parts of the packaging material web which possibly stick to the processing tool, e.g. to the packaging material web downholder, may be released again and moved against the conveyor path, in a mechanical manner, preferably by way of blowing compressed air into the processing region by way of a blow air feed. Empty pouches or very light, wrapped objects are conveyed further on the conveyor path in a secure manner by way of this.

The compressed air exits (nozzles) are preferably arranged in or on the packaging material web downholder. They blow air preferably perpendicularly to the plane of the packaging material or to the conveyor surface. Mechanical release elements are also conceivable as alternatives. Preferably, the blow air is additionally also used for cooling the packaging material web downholder. This is because it has been found that the sticking of the downholder on the material web is reduced by way of cooling, particularly in the case of a film. The packaging material web downholder may comprise channels in its interior, through which the blow air is led, in particularly roughly in the direction of the active edge of the downholder, for the purpose of leading through or circulating the air. If two leading downholders or trailing downholders are present, the respective channels may be connected to one another by way of flexible tubing or other conduits, so that a common connection to the compressed air source is adequate. A part of the air is led through suitable openings (nozzles) onto the material web. Alternatively, the complete air flow may also exit.

The air-cooled packaging material web downholder which is described here, with which the air exits completely or partly and is used for detaching the packaging material web, is advantageously applicable also with processing tools without object downholders. In particular, the air used for cooling is advantageously applied for a double use, specifically simultaneously also for pushing away the web.

The processing tools may be attached on a rigid rotation body, e.g. a wheel, and be moved along a circular path. However, a revolving system with an infinitely shaped revolving path is also possible. Thereby, the processing tools may also be driven individually, in order to realise different path speeds and processing distances.

The conveyor rest may serve as a counter-tool. Alternatively, one may also apply a stationary or co-moved counter-tool (e.g. along a mirror-symmetrical revolving path). The conveyor rest may be interrupted in the processing region or be led around the counter-tool.

The processing tools may be welding bars for thermal welding or ultrasound welding, pressing brackets for connecting pre-glued locations, an embossing device or a separating device for separating packaging units. The packaging material web, for example, is a plastic film, a film of natural material, or paper.

The thickness of the object is an important factor which determines the weight of the objects. A resilient and/or resiliently mounted object downholder exerts a counter-force onto the objects, which is proportional to its deflection and thus is thickness-dependent. Therefore, compensation of the forces acting on the object may be achieved with a suitable dimensioning of the object downholder.

The object downholders may be subdivided transversely to the conveyor direction into individual resilient components, e.g. several resilient rolls lying next to one another, instead of a resilient roller, or several resilient fingers lying next to one another, instead of a uniform bent resilient element. Thickness variations within the same object may be compensated by way of this.

The packaging material web is conveyed with the objects in a synchronous manner by way of a suitable conveyor and turn-over device, and applied around the objects into a bag-tubing. Alternatively, two or more packaging material web parts are led to the objects from the top and the bottom.

BRIEF DESCRIPTION OF THE DRAWINGS

Examples of the invention are represented in the drawings and hereinafter. In a purely schematic manner, there are shown in:

FIG. 3b a sectioned view of a packaging material web downholder from FIG. 3a;

FIG. 4 a detail of a device according to FIG. 2, with two views of a processing tool on processing;

DETAILED DESCRIPTION OF THE INVENTION

Figure 1:
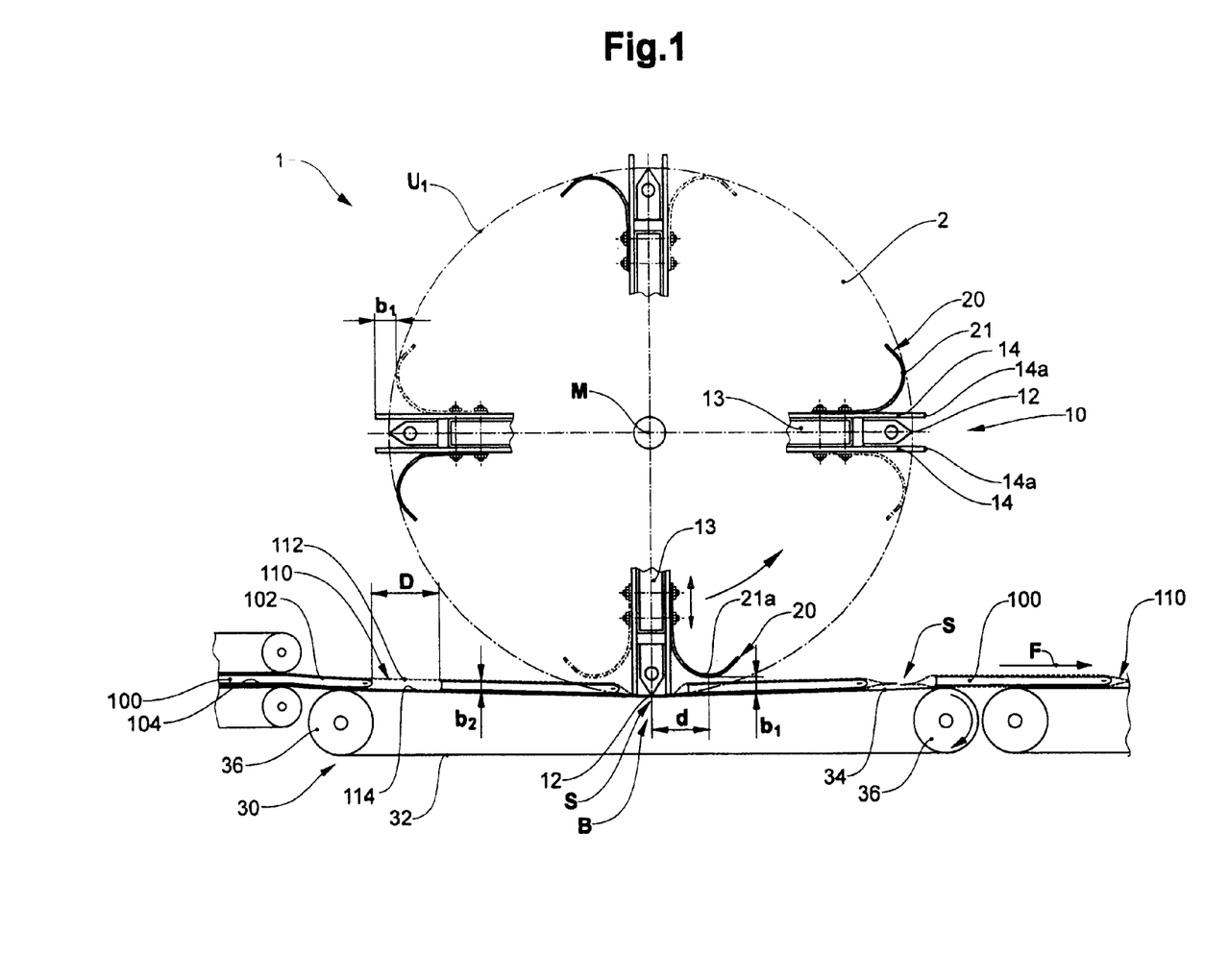
FIG. 1 a packaging device in a view transverse to the conveyor direction, wherein the processing tools of the device comprise packaging material web downholders and object downholders fastened thereon, in the form of bent elements.
Figure 2:
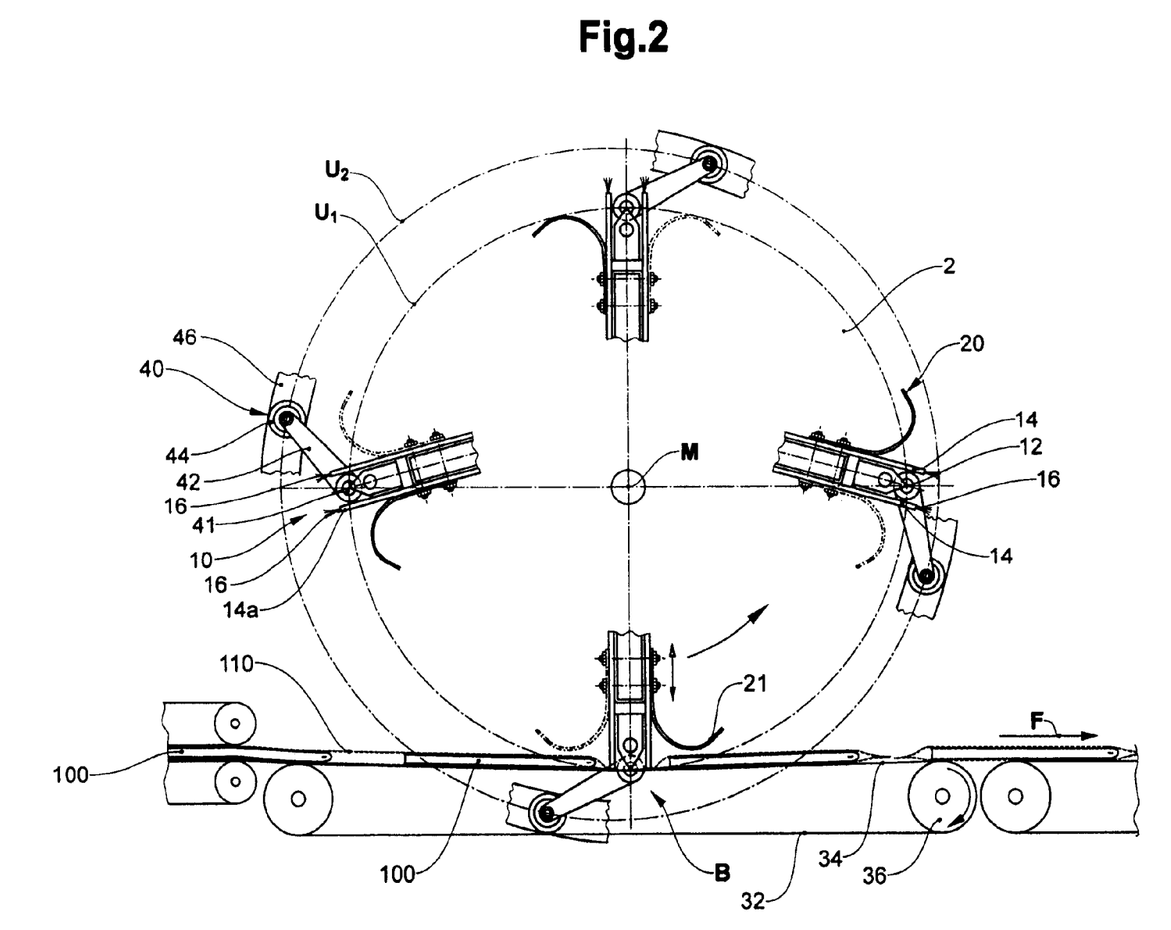
FIG. 2 a packaging device similarly to FIG. 1, wherein the processing tools are controllable with regard to their orientation.
Figure 3A:
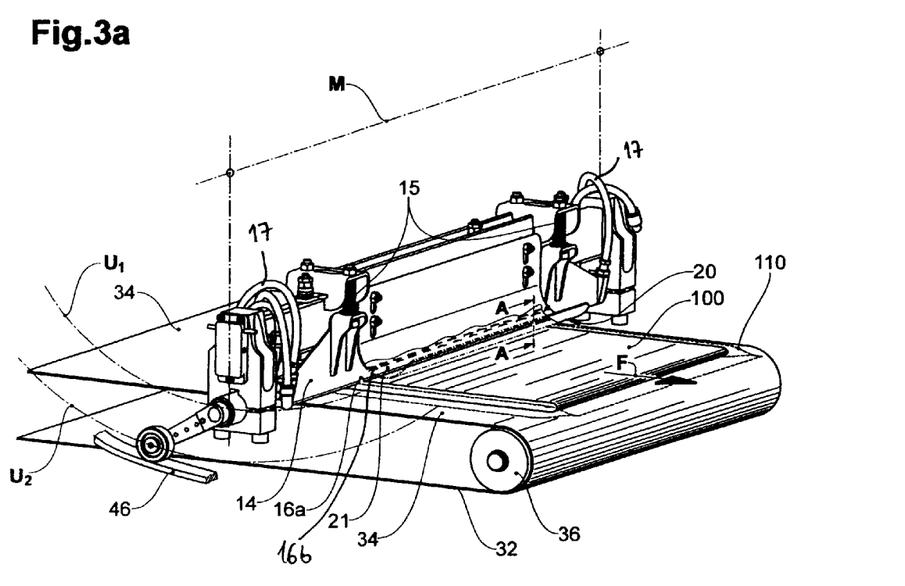
FIG. 3a a perspective view of the device according to FIG. 2.

FIG. 1 shows a view of a packaging device 1 transverse to the conveyor direction F. FIGS. 2 and 3a+b show a slightly modified device 1 in a lateral view and in a perspective view respectively. The common factors of both devices 1 are described hereinafter:

The device, 1 by way of example, comprises four processing tools 10, which are attached on a rotation body 2 and are moved along a circular revolving path U1 about a rotation centre M. The processing tools 10 in FIG. 1 are aligned radially to the rotation centre M. With FIGS. 2 and 3a+b, the orientation of the processing tools 10 may be changed relative to the radial direction. The processing tools 10 in each case comprise a processing-active zone 12, here for example a welding bar, which is mounted on a tool carrier 13. They further comprise in each case two packaging material web downholders 14, which in each case are arranged laterally of the processing zone 12 and are movable in a resilient manner (springs 15, FIG. 3) in the radial direction relative to this zone or to the tool carrier 13. In the unloaded condition, the packaging material web downholders 14 project in the radial direction beyond the processing-active zone 12 (situation at 12, 3 and 9 o'clock in FIGS. 1+2). Under load (counter-pressure by way of the conveyor surface 34), they spring back so far that the processing-active zone 12 is located in the plane of their radially outer lying edges 14a or projects beyond these (situation at 6 o'clock in FIGS. 1+2).

For each processing tool 10, at least one object downholder 20 is present, which here by way of example, leads the processing-active zone 12 in the revolving direction. Preferably additionally, a trailing object downholder 20 is present (drawn in a dashed manner). The object downholder 20 in this example consists of an element 21 which in the lateral view is bent in a channel-like manner and is concavely bent with respect to the conveyor device 30. The element 21 is fastened on the leading or trailing packaging material web downholder 14. By way of this, it may be displaced with this in the radial direction relative to the processing-active zone 12 when the packaging material web downholder 14 springs in.

Figures 3B, 4:
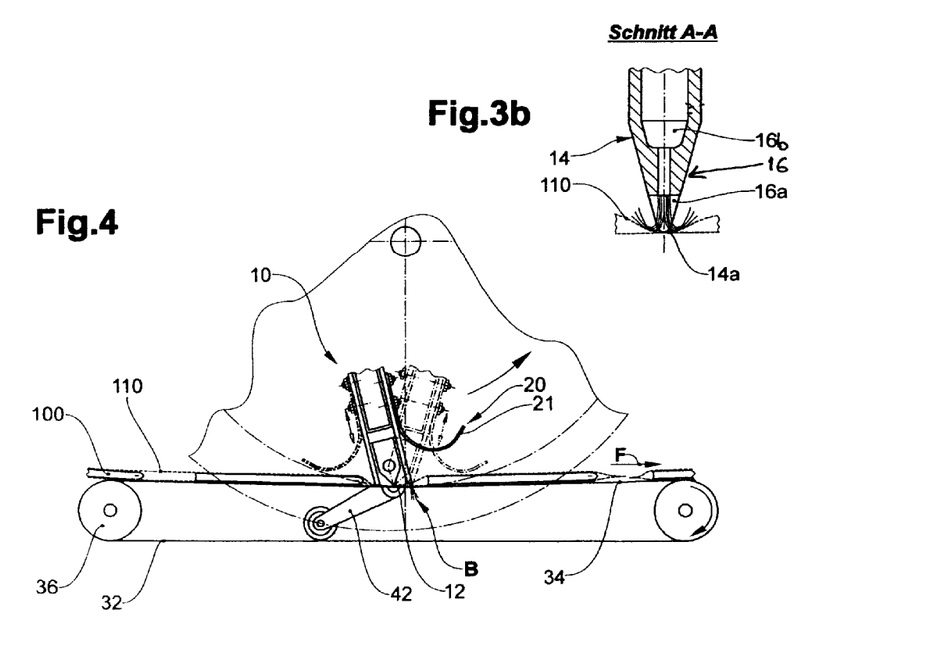

As FIGS. 2 and 3a+b schematically show, the packaging material web downholders 14 comprise several compressed air nozzles 16. The nozzle openings 16a are arranged along the edges 14a of the packaging material web downholders 14. The compressed air is led in the interior of the packaging material web downholder 14 in channels 16b, which here by way of example run parallel to the active edge 14a of the downholder. The packaging material web downholder 14 is simultaneously cooled by way of this. The air channels 16b in the two leading and trailing packaging material web downholders 14 of a tool are connected to one another by way of flexible tubing 17, so that a common compressed air feed is sufficient.

The entry location of the compressed air, by way of example, here is in the region of the tool which is at the right in the conveyor direction F, and the exit is at the opposite location.

FIG. 3b shows a section along the line A-A in FIG. 3a. The outflow direction of the air is in the plane of the packaging material web downholder 14 and essentially perpendicular to the packaging material web 110.

A conveyor device 30, here in the form of a belt conveyor, is located below the rotation body 2. It comprises a conveyor belt 32 which is deflected around at least two rollers 36. Its upper face defines a largely plane conveyor surface 34 for objects 100 lying thereon. They are moved in the conveyor direction F. The conveyor belt 32 is yielding in the region between the rollers 36, i.e. may sag under loading. The conveyor belt 32 may also be deformable per se, for example, by way of it having a compressible damping layer. The conveyor belt 32 or the conveyor surface 34 acts as a counter tool for the processing tools 10. It is orientated tangentially to the movement path U1 of the processing-active zone 10. The region of the greatest approach between the movement path U1 and the conveyor surface 34 is called the processing region B.

Objects 100 are conveyed lying behind one another in a row on the conveyor belt 32. The distance between two consecutive objects 100 (thus the gap between two objects 100) is indicated at D. The objects 100 are covered at their upper and lower side 102, 104 by a material web 110. They are, for example, inserted into a flexible bag-like tubing of a material web 110 enveloped in the conveyor direction, or covered by two part material webs. The processing tools 10 are designed such that connections S between the upper region and the lower region 112, 114 of the material web 110 may be created in the region between the two objects 100. The connections S here are orientated transversely to the conveyor direction F, but could however also have a different orientation, e.g. in the longitudinal direction. It is particularly the case of welding seams. The packaging units may be separated along the connections S directly after or on connecting the upper and the lower material web regions 112, 114.

The region of the bent part 21, whose distance to the rotation centre M is the greatest, is indicated at area 21a. The radial distance between the plane through the edges 14a and the region 21a is indicated at b1. It corresponds in this example roughly to a critical object thickness b2 or is larger than an object thickness b2. The packaging material web downholders 14 together with the object downholder 20, may spring back with respect to the processing-active zone 12.

Seen in the conveyor direction F or peripheral direction of the rotation body 2, the region 21a has a distance d to the processing-active zone 12. The distance d is larger than half the distance D between the objects 100. By way of this, one ensures that the object downholder 20 indeed cooperates with the object 100 and not only with the material web 110 in the region between the objects 100.

The device functions as follows: The rotation body 2 and the conveyor device 30 are driven in a manner such that the objects 100 on the conveyor belt 32 and the processing-active zones 12 of the processing tools 10 are moved with the same path speed. The processing tools 10 meet the gaps between two objects 100. The edges 14a of the packaging material web downholders 14, which project beyond the revolving path U1, in the processing region B firstly hit the upper region 12 of the material web 110, then the lower region 114. By way of this, the material web 110 is smoothed between the two downholders 14 and at least above the leading object 100. By way of counter-pressure of the conveyor surface 34, the packaging material web downholders 14 spring in, the processing-active zone 12 hits the material web 110 and the connection S is created. The conveyor rest 34 also moves somewhat downwards, i.e. away from the rotation centre M, by way of the pressure of the processing tool 10. On rotating further, the processing-active zone 12 detaches from the material web 110, the packaging material web downholders 14 spring into their initial position, and the pressure on the conveyor rest 34 is relieved. The conveyor rest 34 likewise returns into its initial position.

The release of the packaging material web 110 from the packaging material web downholders 14 is encouraged by way of the blow air exiting from the nozzles 16. It is ensured by way of this that very light, enveloped objects or empty pouches detach from the processing tool in a reliable manner and are not moved further with these. The blow air feed may be continuous or also in intervals by way of a suitable control. The blow air is fed directly after the processing at least in the processing region.

The object downholders 20 are shaped such that they may press the object 100 against the conveyor rest 34 when the conveyor rest 34 springs back into its initial condition and gives the object 100 an impulse to the top or towards the rotation body 2. The object downholders 20 for this are resilient per se or are mounted in a resilient manner, and in particular are formed by the elastic element and may yield towards the rotation centre M.

The radial distance b1 to the ends 14a of the downholders 14, remains constant by way of the object downholder 20 being connected to the respective packaging material web downholder 14 in a fixed manner.

The fixed connection to the packaging material web downholder 14 has the following effect: When the tool 10 approaches the processing region B, the object downholders 20 are still in a position, in which they are maximally distanced to the rotation centre M. They may therefore roll on the object 100 when the tool 10 moves into the processing region B. By way of the counter-pressure of the conveyor rest 34, the packaging material web downholders 14 and thus object downholders 20 are pressed towards the rotation entre M. The region 21a is therefore distanced to the object 100 or to the material web 110 lying thereon. A pulling tight of the material web 110 is not inhibited by the object downholder 20. On further rotation, the processing-active zone 12 detaches from the material web 110 and the pressure on the packaging material web downholders 14 reduces and the packaging material web downholders are moved outwards again with the object downholders 20. The object downholders 20 may then contact the objects 100 again and position them in a secure manner. Additionally, the object downholders 20 guide the objects 100 with the reduction of the processing pressure and, thus, prevent the objects 100 from lifting from the conveyor surface 34. The force which is exerted by the upwardly resilient conveyor rest 34 and which acts upwards, is at least partly compensated by the object downholders 20.

The objects 100 shown here have a thickness b2, which is smaller than b1. The object downholder 20 then in the processing region B only exerts a pressure onto the objects 100 if these spring back too greatly towards the rotation centre M.

FIGS. 2 and 3a+b show one variant of the device 1 of FIG. 1, with which the orientation of the tools 10 relative to the rotation body 2 may be controlled with a control device 40. For this, the tools 10 are arranged on the rotation body 2 in a pivotable manner. The pivot axis 41 in each case goes through the processing-active zone 12. The orientation is set by way of the tools 10 being connected to levers 42. The orientation of the levers 42 may be varied by way of a stationary control cam 46, by way of cam rollers 44 connected to the levers 42 rolling on the control cam 46. The cam guide revolving path U2 is fixed by the control cam 46. The control cam 46 is shaped such that the processing-active zone 12 of the tools 10 in front of the processing region B in the revolving direction is orientated in a leading manner with respect to the tool carrier 13, and in a trailing manner after the processing region B. The tool 10 may be well placed onto the material web even between thicker objects 100 by way of this.

FIG. 4 shows a detail of the device according to FIGS. 2 and 3a during processing. The position of the tool 10 directly at the beginning of the processing is shown in unbroken lines. The position of the tool 10 towards the end of the processing is shown in dashed lines. One recognises that the tool 100 rolls on the processing location. The release of the material web from the downholder 14 is encouraged by the feed of blow air.

Figure 5:
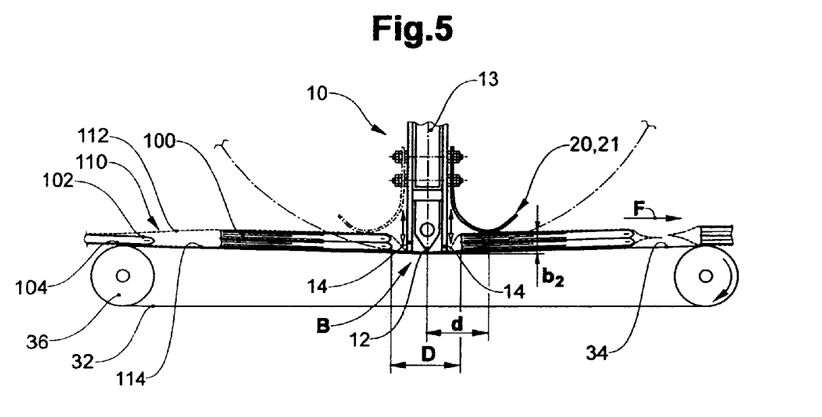
FIG. 5 a further example of a processing tool with an object downholder in the form of a bent element, which is fastened on the tool carrier.

FIG. 5 shows the processing region B in another design variant. The tools 10 including the packaging material web downholders 14 and the object downholders 20 are in principle constructed in the same manner as in the preceding figures, with the following difference: The object downholders 20 are not fastened on the packaging material web downholders 14, but directly on the tool carrier 13 of the processing-active zone 12. Their distance to the processing-active zone 12 is therefore constant, and the distance to the packaging material web downholders 14 is variable on account of their resilient mounting.

The shape and the position of the object downholders 20 relative to the tool carrier 13 is designed such that objects 100 of a critical thickness b2 (here, two individual products lying over one another, with a total thickness b2) in the processing region B may be slightly pressed against the conveyor rest 34, without the object downholder 20 being greatly deformed. Thinner objects 100 in this case are likewise held in a guided manner, when they spring back from the conveyor surface 34. Even thicker objects 1090 may likewise be received and positioned between the object downholder 20 and the conveyor surface 34, wherein the object downholder 20 deforms accordingly.

Figure 6:
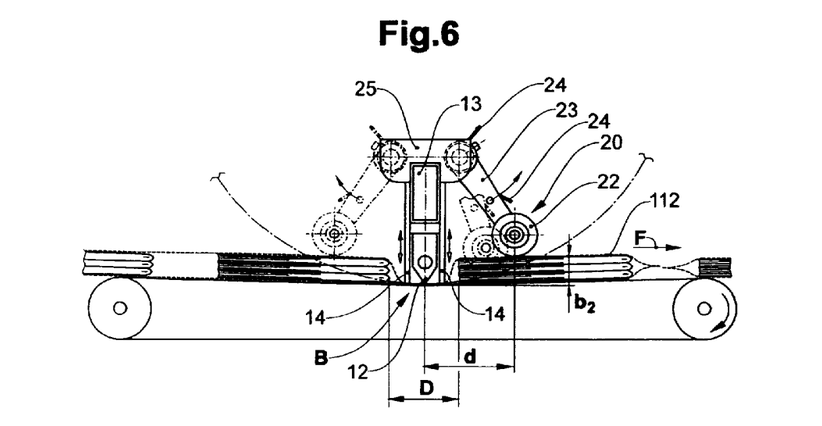
FIG. 6 a further example of a processing tool with an object downholder in the form of a resiliently mounted roller or several rolls lying next to one another.

FIG. 6 shows a further variant of the processing tools 10 or the object downholders 20. The object downholders 20 here are designed as freely rotatable rollers 22. These are mounted in a pivotable manner, directly or indirectly on the tool carrier 13 of the processing-active zone 12 by way of a lever 33. The packaging material web downholder 14 is resilient relative to this. Here, a yoke 25 is present, which is firmly connected to the tool carrier 13 and serves as a mounting for the lever 23. The lever 23 is resilient; a spring 24, e.g. a leaf spring or spiral spring serves for pressing the roller 22 towards the processing-active zone 12 in the unloaded condition. The lever 23 under a force effect may be pushed by way of an object 100 against this spring force, in the direction of the bent arrow. In the unloaded condition, in turn, a distance between the processing-active zone 12 and the roller 22 is set, which corresponds roughly to the critical object thickness. The leading object downholder 20 is shown additionally in the unloaded condition (drawn dashed).

This variant has the advantage that the object downholder 20 may roll on the object 100 or on the upper material web part 112. The object 100 or the upper material web part 112 is therefore not displaced in the conveyor direction or compromised in any other manner by way of the friction with the object downholder 20, when the tool 10 moves into the processing region B or on leaving the processing region B.

In the present case, the objects 100 are small stacks, here from three individual products.

Figure 7:
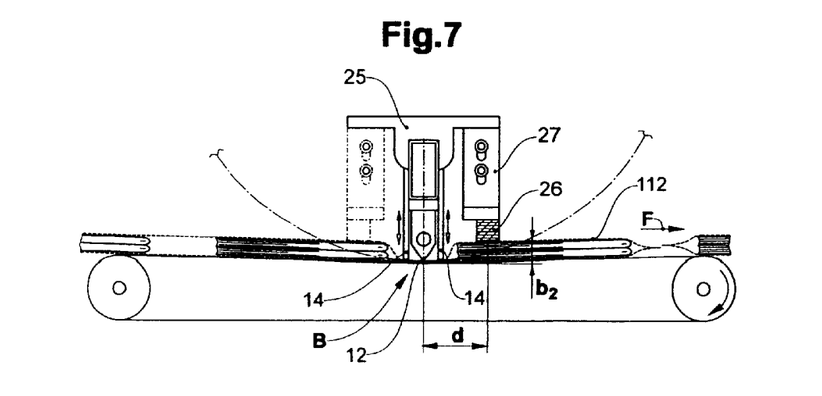
FIG. 7 a further example for a processing tool with an object downholder in the form of a resiliently mounted punch.

FIG. 7 shows a further example for object downholders 20, here in the form of compressible punches 26 which are mounted via an extension piece 27, likewise on a yoke 25. The packaging material web downholders 14 are movable relative thereto. The compressible punch 26 consists for example of foam. It has a plane lower side with which it lies in a large-surfaced manner on the object or on the upper material web region 112. Such object downholders 20 are very simple with regard to design and load the object in a relatively uniform manner on account of the surfaced effect.

The object downholders 20 seen in the conveyor direction also act a distance d to the processing-active zone 12 in the cases of FIG. 5-7, wherein d>D/2 (half the object distance).

The invention claimed is:

1. A device for packaging flat objects, in particular printed products, with a packaging material by way of at least one packaging material web, the device comprising:
    a conveyor device with an essentially plane conveyor surface that is capable of conveying the flat objects one after the other and distanced to one another, in a conveyor direction; and
    at least one processing tool with a processing-active zone, wherein the processing tool is capable, in a processing region of the device, of processing the packaging material web in the region between two objects, when the packaging material web covers the objects on both sides, and wherein the processing tool is movable at least perpendicularly to the conveyor surface;
    wherein at least one object downholder, which, in the conveyor direction after the processing-active zone of the processing tool, is capable of holding down the foremost object in order to calm said foremost object;
    and wherein the object downholder is fastened on the processing tool, and the processing tool is movable with a movement component in the conveyor direction.

2. The device according to claim 1, wherein the object downholder is capable of pressing objects against the conveyor surface if a thickness of the object lies above a critical object thickness.

3. The device according to claim 1, wherein the object downholder comprises an elastically deformable element and/or is resiliently mounted.

4. The device according to claim 3, wherein the object downholder has a shape elasticity provided by a bent, surfaced shape part.

5. The device according to claim 3, wherein the object downholder comprises at least one resiliently mounted, freely rotatable roll or roller.

6. The device according to claim 1, wherein the object downholder has an active surface that is concavely bent relative to the conveyor surface.

7. The device according to claim 1, wherein at least one object downholder is present, which is capable of acting on the objects, in the conveyor direction, in front of and/or after the processing-active zone of the processing tool.

8. The device according to claim 1, wherein the object downholder is movable synchronously with the processing tool.

9. The device according to claim 1, wherein the processing tool comprises at least one packaging material web downholder that is capable of holding down the packaging material web in the region between two objects by exerting a force onto an upper region of the packaging material web and by way of this, onto a lower region of the packaging material web, before the processing-active zone of the processing tool for processing presses the packaging material web while exerting a force.

10. The device according to claim 9, wherein the object downholder is fastened on the packaging material web downholder and is movable with this relative to the processing active zone of the processing tool.

11. The device according to claim 9, wherein the object downholder is fastened on a tool carrier for the processing-active zone of the processing tool, wherein the packaging material web downholder is movable relative to the object downholder.

12. The device according to claim 1, wherein the processing-active zone of the processing tool is movable along a closed revolving path, which in the processing region runs in the direct proximity of, and essentially parallel to, the conveyor surface, and wherein the orientation of the tools relative to the revolving path controllable by way of a control cam defining a cam revolving path.

13. The device according to claim 1, wherein the processing tool is designed to create connections in the region between two objects, between an upper region that is distant to the conveyor surface, and a lower region of the packaging material web, which faces the conveyor surface.

14. The device according to claim 1, further comprising at least one blow air feed, said air blow feed being capable of blowing blow air for releasing the packaging material web from the processing tool, into the processing region, wherein the blow air feed comprises at least one blow air nozzle, which is arranged on the packaging material web downholder.

15. The device according to claim 14, wherein the blow air is led through the packaging material web downholder and simultaneously serves for to cool said packaging material web downholder.

16. A method for packaging objects, in particular printed products, with packaging material by way of at least one packaging material web, comprising the following steps:
  conveying objects one after the other and distanced to one another, in a conveyor direction through a processing region, wherein the packaging material web covers the objects on both sides;
  moving the processing tool in the processing region at least perpendicularly to the conveyor surface;
  processing the packaging material web in the region between two objects,
  calming at least object foremost to the processing region in the conveyor direction by way of holding down with an object downholder (20), and
  moving the processing tool in the processing region with a movement component in the conveyor direction and moving the object downholder fastened on the processing tool synchronously with the processing tool.

17. The method according to claim 16, wherein the processing-active zone of the processing tool is moved along a closed revolving path, which in front of, in and after the processing region, runs in the direct spatial proximity of, preferably essentially parallel to, the conveyor surface.

18. The method according to claim 16, wherein the objects in the conveyor direction are held down by way of at least one object downholder in front of, and/or after the processing-active zone of the processing tool.

19. The method according to claim 16, wherein in the processing region, blow air is blown into the packaging material web by way of a blow air nozzle that is arranged on the packaging material web downholder and ejects blow air essentially perpendicularly to the packaging material web.

* * * * *